Jan. 31, 1928.

P. KUKEC

ELECTRIC HEATER

Filed July 12, 1927    3 Sheets-Sheet 1

1,657,932

Inventor

Paul Kukec

By Clarence A. O'Brien
Attorney

Jan. 31, 1928.
P. KUKEC
1,657,932
ELECTRIC HEATER
Filed July 12, 1927    3 Sheets-Sheet 2
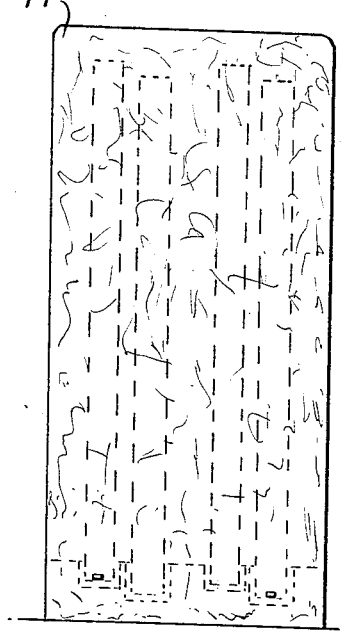
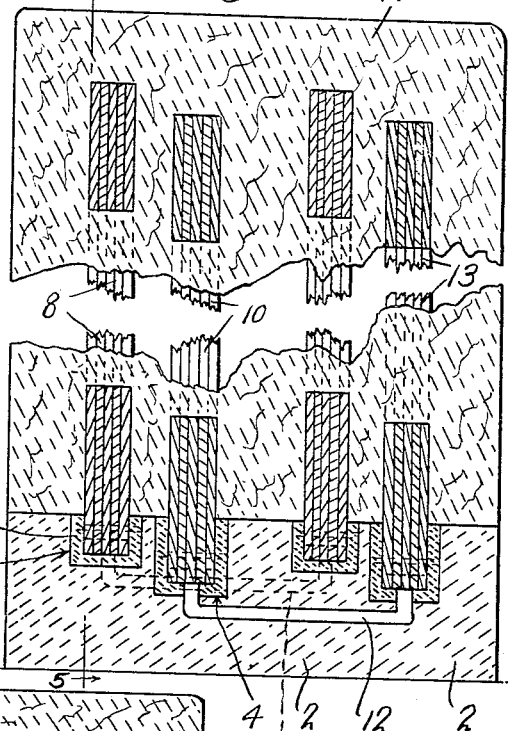
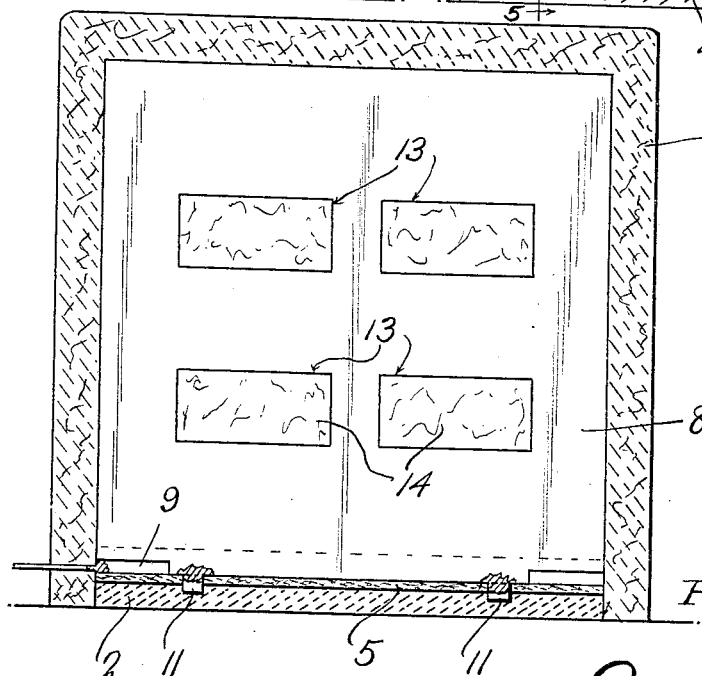
Inventor
Paul Kukec
By Clarence A. O'Brien
Attorney Jan. 31, 1928.
P. KUKEC
1,657,932
ELECTRIC HEATER
Filed July 12, 1927
3 Sheets-Sheet 3
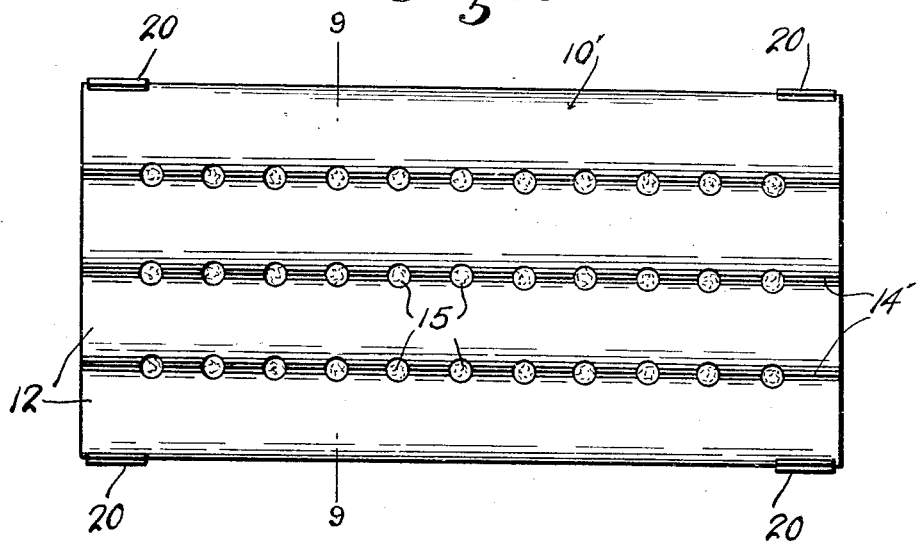
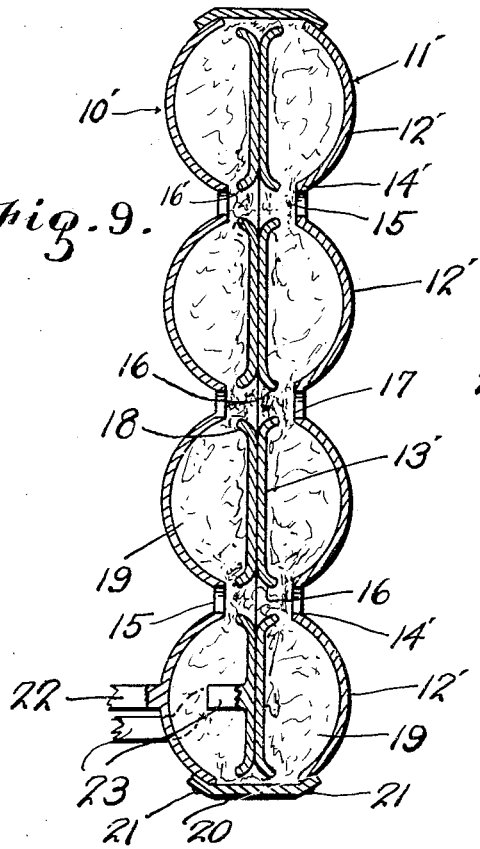
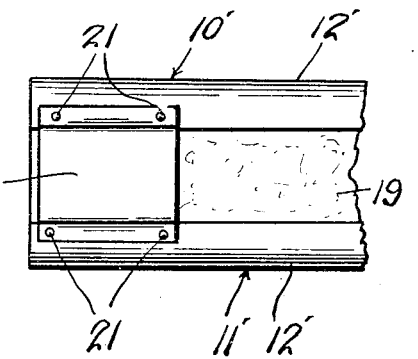
Inventor
Paul Kukec
By *Clarence A. O'Brien*
Attorney Patented Jan. 31, 1928.

1,657,932

UNITED STATES PATENT OFFICE.

PAUL KUKEC, OF CHICAGO, ILLINOIS.

ELECTRIC HEATER.

Application filed July 12, 1927. Serial No. 205,153.

The present invention relates to improvements in electric heaters, and has for its principal object to provide a simple and efficient device for supplying heat and includes a structure which may be readily and easily installed in a boiler for heating the water therein to generate steam.

One of the important objects of the present invention is to provide an electric heater of the above mentioned character which includes the provision of spaced positive and negative filament plates which are submerged in the water the latter passing in a circuitous manner around the plates and providing an electrical connection between the positive and negative plates with an invisible flare ray, which reproduces the heat to be used in generating the steam in the boiler.

A further object of the invention resides in the provision of an electric heater wherein gypsum may be employed as an electrical conducting agent between the positive and negative filament plates for completing the circuit, the gypsum being subjected to the water whereby its electrical conductive properties will be greatly increased.

A still further object is to provide an electric heater of the above mentioned character which is simple in construction, inexpensive, strong and durable and further well adapted to the purpose for which it is designed.

Other objects and advantages of the invention will become apparent from the following description when taken in connection with the accompanying drawings:

In the accompanying drawings, forming part of this application, and in which like numerals indicate like parts:

Figure 3 is an end elevation of the heater per se.

Figure 4 is a vertical sectional view through the heater showing the construction and arrangement of the positive and negative plates, and the manner in which the same are mounted in the channels formed in the fire clay base, parts being broken away.

Figure 5 is a sectional view taken substantially on the line 5—5 of Figure 4 looking in the direction of the arrows.

Figure 7 is a side elevation of another form of the electric heater.

Figure 8 is a top plan view of one end portion of the heater shown in Figures 7 and 9, and for more clearly disclosing the connecting member between the spaced plates, and Figure 9 is a vertical sectional view taken substantially on the line 9—9 of Figure 7.

Figure 1:
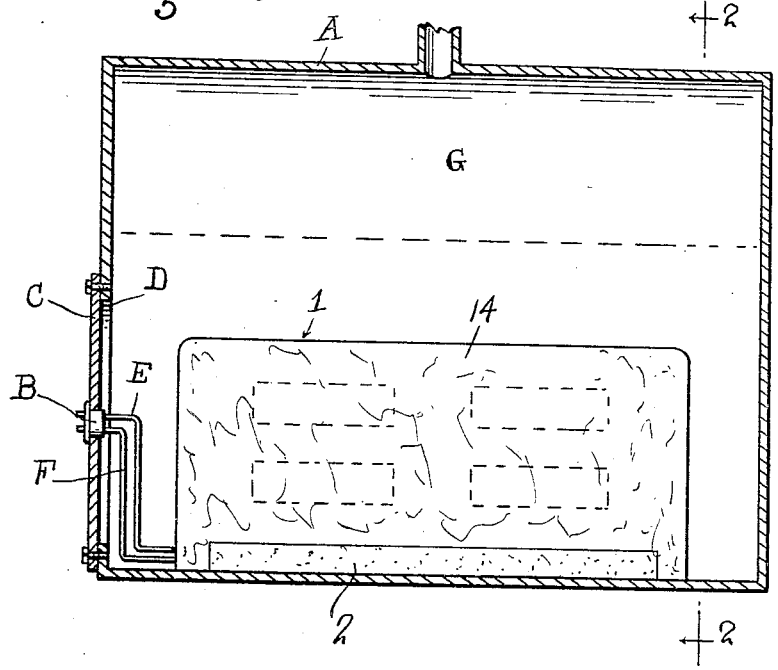
Figure 1 is a side elevation of one form of the electric heater showing the same submerged in the water in a boiler, the latter being shown in section.
Figure 2:
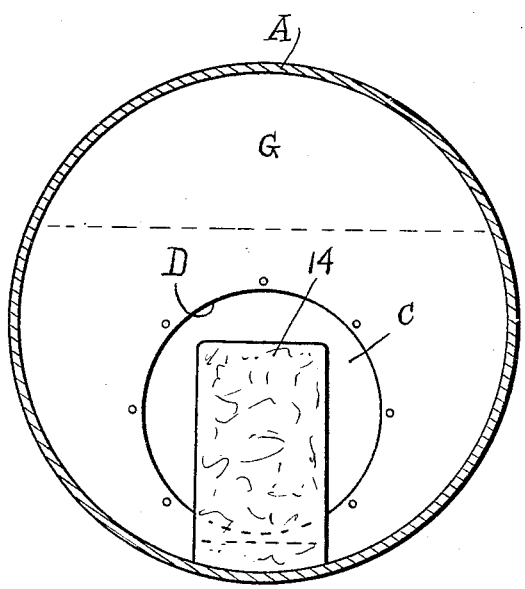
Figure 2 is a vertical sectional view taken approximately on the line 2—2 of Figure 1 looking in the direction of the arrows.

In the drawings, with reference more particularly to Figures 1 to 6, inclusive, the numeral 1 designates generally the electric heater, the same comprising a substantially rectangular shaped base 2 formed of fire clay or other non-conductive material. This base is adapted to rest on the bottom of a boiler A. The base is formed with a series of longitudinally extending channels in the upper face thereof as indicated by the numerals 3 and 4, respectively.

Figure 6:
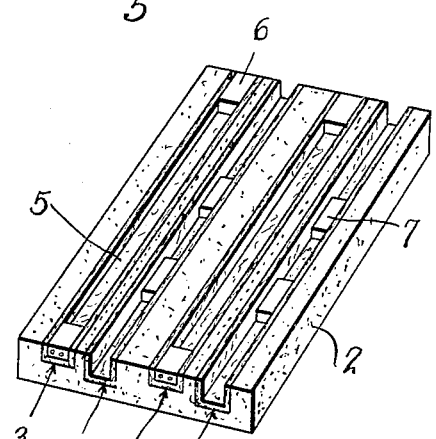
Figure 6 is a perspective view of the base forming a part of the present invention.

The channels 3 do not extend downwardly as deep as the channels 4 and this construction is clearly disclosed in Figures 4 and 6 of the drawings. The purpose of this construction will be presently apparent. Each channel is lined with gypsum as indicated at 5.

A pair of metallic blocks such as is shown at 6 is arranged in each of the channels 3 adjacent the respective ends thereof, a similar pair of blocks 7 being arranged in the intermediate portions of the deeper channels 4 as also clearly illustrated in Figure 6.

Arranged vertically in the channels 3 are the positive filament plates 8, the lower edges of which plates are cut out at their respective ends as illustrated at 9 with reference more particularly to Figure 5 so that the lower edge portion of each positive filament plate will be disposed between the metallic blocks 6 thus preventing the longitudinal slidable movement of the positive plates with respect to the fire base 2.

A similar series of negative filament plates 10 have their lower edge portions disposed in the deeper channels 4 and it will be readily obvious that the intermediate portion of the lower edge of each of the negative filament plates is cut out in order to accommodate the intermediate blocks 7 so that said negative filament plates will also be held in proper position on the base against longitudinal slidable movement.

The positive, as well as the negative filament plates may consist of either a single brass plate of suitable thickness or may comprise a series of relatively thin laminations of brass as is disclosed in Figure 4.

The positive filament plates are connected together by means of connecting strips 11, while a similar connection is afforded between the negative filament plates through the medium of the strips 12. These connecting strips are embedded in the fire clay base 2 and the arrangement of the connecting strips is clearly shown in Figures 4 and 5 of the drawings.

By forming the channels in the manner as shown in the drawings so that certain of the channels are deeper than others, the upper edges of the positive filament plates will extend above the upper edges of the negative filament plates, and this is clearly shown in Figure 4.

Each of the filament plates is also of substantially rectangular design as shown in Figure 5, and is further formed with a series of rectangular shaped openings 13. The positive and negative filament plates as well as the fire clay base are coated with gypsum as at 14 so that the positive and negative filament plates will be entirely embedded in the gypsum and the openings 13 formed in the positive and negative filament plates will provide a means whereby the gypsum may be readily and easily saturated with the water in the boiler and the purpose of using gypsum is to attain a more positive and efficient electrical connection between the positive and negative plates as it is a well known fact that gypsum is a very good conductor of electricity when wet.

It will also be observed that due to the staggered arrangement of the positive and negative plates, the openings 13 in these plates will not be disposed in alignment, thereby causing the water to circulate through the openings and the gypsum in a circuitous or staggered manner.

An electric plug B of any well known construction is mounted in a suitable opening provided therefor in the closure C for the enlarged opening D provided in one end of the boiler A. This plug is electrically connected with the positive and negative plates by means of the conductor wires E and F. This electric plug is adapted to be operatively connected to a suitable source of electric supply for supplying current to the heater, and when the heater is disposed in the boiler and submerged below the water in the manner as clearly shown in Figure 1, the current will pass through the positive and negative plates, the flow of the water through the openings 13 thoroughly wetting the gypsum whereby the latter will aid in producing the maximum amount of heat so that the water in the boiler will be heated to generate steam in the steam chamber G in the top of the boiler A. By employing gypsum the water will be prevented from becoming charred and furthermore will prevent the formation of soot as would result if the gypsum was not used.

With reference now to Figures 7, 8 and 9, of the drawings wherein there is shown another form of electric heater, the numerals 10′ and 11′ designate a pair of vertically spaced positive plates, each of which consists of a series of laminations of brass or other suitable metal, or may be formed of a single piece of brass of suitable thickness. As is clearly shown in the drawings, the positive plates are formed with the longitudinally extending parallel spaced bulged portions 12′, the outwardly bulged portions 12′ being disposed in opposed relation so as to form substantially circular pockets between the positive plates.

A negative filament plate designated generally by the numeral 13′ is arranged centrally between the spaced positive plates 10′ and 11′ and this negative plate is also formed of brass, and in the present instance, consists of two laminations. The flat portions 14′ of the positive plates 10′ and 11′ are formed with a series of spaced openings 15, the openings in the plates 10′ registering with the openings in the plates 11′. The negative plate 13′ is formed with a series of openings 16 for registration with the alined openings 15 formed in the positive plates. The openings in the negative plate are formed by punching out portions of the laminations in the manner as shown at 16′ with reference more particular to Figure 9.

Certain of the layers or laminations comprising the negative plate 13′ are disposed outwardly on one side of the plate, while other lamination is disposed outwardly on the opposite side as indicated at 17 and 18, and these outwardly disposed portions cooperate with the edge portions of the outwardly bulged sides 12′ to retain the gypsum 19 within each of the circular pockets formed therefor by the outwardly bulged portions 12′. It is of course to be understood that the gypsum is firmly compressed so as not to interfere with the flow of the water through the openings 15 whereby the gypsum may be thoroughly subjected to the water.

For further connecting the parts comprising the heater shown in Figures 7 to 9 inclusive, I provide the clamping strips 20, the same extending across the upper and lower edges of the positive plates at each corner and having the sides of each strip secured to the respective positive plates by any appropriate fastening means such as is shown at 21. These strips will provide a unitary structure and will hold the parts of the heater above described together.

The heater above described is adapted to be disposed in a boiler below the water line and rests on a suitable support of non-conductive material. One of the positive plates is formed at one end with a terminal 22, a similar terminal 23 being associated with one of the outer ends of the negative plate 13', and these terminals are connected together to a suitable source of electric supply, not shown.

If desired, the heater shown in Figures 7, 8, and 9 may have its positive plates coated with the gypsum in the manner similar to that in which the positive and negative plates shown in Figures 1 to 6 are covered with the gypsum. The gypsum will furthermore tend to eliminate the invisible flare rays.

The provision of an electric heater of the above mentioned character will enable the same to be substituted in place of a coil or oil burner, and furthermore be capable of being submerged in a body of water for more easily heating the water to generate steam than the ordinary type of water heaters now generally on the market.

While I have shown the preferred embodiment of my invention, it is to be understood that various changes in the size, shape and arrangement of parts may be resorted to without departing from the spirit of the invention and the scope of the appended claims.

Having thus described the invention, what I claim as new and desire to secure by Letters Patent is:—

1. An electric heater comprising spaced positive plates, each of said positive plates being bulged to form a series of spaced pockets, the portions of the plates between the series of pockets being formed with water passages, a negative plate disposed between the positive plates and formed with openings communicating with the openings in the positive plates, and an electric conducting agent within the pockets.

2. An electric heater comprising spaced positive plates, each of said positive plates being bulged to form a series of spaced pockets, the portions of the plates between the series of pockets being formed with water passages, a negative plate disposed between the positive plates and formed with openings communicating with the openings in the positive plates, an electric conducting agent within the pockets, and means for securing the positive plates together.

3. An electric heater comprising spaced positive plates, each of said positive plates being bulged to form a series of spaced pockets, the portions of the plates between the series of pockets being formed with water passages, a negative plate disposed between the positive plates and formed with openings communicating with the openings in the positive plates, an electric conducting agent within the pockets, means for securing the positive plates together, said last mentioned means comprising strips extending across the edges of the positive plates at the corners thereof, the ends of the strips being secured to the respective positive plates.

4. An electric heater comprising a base of non-conductive material, said base being formed with a series of channels in the upper face thereof, spaced positive plates having their lower edge portions disposed in certain of said channels, negative plates having their lower edge portions disposed in other of said channels for disposition between the positive plates, means for electrically connecting the positive plates together, means for electrically connecting the negative plates together, each of said plates being formed with water passages, and an electric conducting agent between the positive and negative plates.

5. An electric heater comprising a base of non-conductive material, said base being formed with a series of channels in the upper face thereof, spaced positive plates having their lower edge portions disposed in certain of said channels, negative plates having their lower edge portions disposed in other of said channels for disposition between the positive plates, means for electrically connecting the positive plates together, means for electrically connecting the negative plates together, each of said plates being formed with water passages, an electric conducting agent between the positive and negative plates, said electric conducting agent consisting of gypsum.

6. An electric heater comprising a base of non-conductive material, said base being formed with a series of longitudinally extending channels in the upper face thereof, spaced positive plates having their lower longitudinal edge portions disposed in certain of said channels, negative plates having their lower longitudinal edge portions disposed in other of said channels for disposition between the positive plates, means for electrically connecting the positive plates together, means for electrically connecting the negative plates together, each of said plates being formed with water passages, an electric conducting agent between the positive and negative plates, and coacting means between the channels and the lower edges of the respective plate for preventing longitudinal sliding movement of the plate with respect to the base.

7. An electric heater comprising a base of non-conductive material, said base being formed with a series of longitudinally extending channels in the upper face thereof, spaced positive plates having their lower longitudinal edge portions disposed in certain of said channels, negative plates having their lower longitudinal edge portions disposed in other of said channels for disposition between the postive plates, means for electrically connecting the positive plates together, means for electrically connecting the negative plates together, each of said plates being formed with water passages, an electric conducting agent between the positive and negative plates, and coacting means between the channels and the lower edges of the respective plate for preventing longitudinal sliding movement of the plate with respect to the base, said last mentioned means comprising blocks arranged in the channels, the lower edges of the plates being cut out to receive the blocks.

In testimony whereof I affix my signature.

PAUL KUKEC.